US006681220B1

(12) United States Patent
Kaplan et al.

(10) Patent No.: US 6,681,220 B1
(45) Date of Patent: Jan. 20, 2004

(54) REDUCTION AND OPTIMIZATION OF INFORMATION PROCESSING SYSTEMS

(75) Inventors: Marc A. Kaplan, Lewisboro, NY (US); Kelly Anne Shaw, Mountain View, CA (US); Daniel C. Sturman, Englewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/322,521

(22) Filed: May 28, 1999

(51) Int. Cl.[7] .......................... G06F 17/30; G06F 15/16
(52) U.S. Cl. ............................. 707/4; 707/5; 709/217; 709/203; 708/400; 708/5
(58) Field of Search ................... 709/217, 218, 709/219, 101, 102, 203; 703/2; 712/7–8, 25, 203; 707/1, 2, 3, 4, 5; 708/5, 400

(56) References Cited

U.S. PATENT DOCUMENTS

| | | | | |
|---|---|---|---|---|
| 5,175,843 A | * | 12/1992 | Casavant et al. | 395/500 |
| 5,412,804 A | * | 5/1995 | Krishna | 395/600 |
| 5,701,456 A | * | 12/1997 | Jacopi et al. | 395/604 |
| 5,857,097 A | * | 1/1999 | Henzinger et al. | 395/583 |
| 6,032,144 A | * | 2/2000 | Srivastava et al. | 707/3 |

OTHER PUBLICATIONS

Reflection in the Gryphon Message Brokering System, Sturman, D.; Banavar, G.; Strom, R.; In Reflection Workshop of 13th ACM Conference on Object Oriented Programming Systems, Languages and Applications, Oct. 1998, 12 pages.*

Site and scheduling policies in multicomputer database systems, Freider, O.; Baru, C.K., Knowledge and Data Engineering, IEEE Transactions, vol. 6, Aug. 1994, ISSN: 1041–4347, pp. 609–619.*

A data–flow graphical user interface for querying a scientific database, Tjan, B.S.; Breslow, L.; Dogru, S.; Rajan, V.; Rieck, K.; Slagle, J.R.; Poliac, M.O., Visual Languages, Proceedings IEEE Symposium, Aug. 1993, ISBN: 0–8186–3970–9, pp. 49–54.*

Query processing for knowledge bases using join indices, Shrufi, A.; Topaloglou, T., Conference on Information and Knowledg Management, Proceedings 4th International Conf. on Information and Knowledge Management, 1995, ISBN: 0–89791–812–6, pp. 158–166.*

Combinatorial algorithm for the generalized circulation problem, Golberg, A.V.; Plotkin, A. S.; Tardos, E., this paper appears in: Foundation of Computer Science, 1988., 29th Annual Symposium on Oct. 24–26, 1988, pp. 432–443.*

High performance DSP software using data–flow graph transformations, Zivojnovic, V. ; Ritz, S.; Meyr, H.; this paper appear in: Signals, Systems and Computers, 1994. Conference Record on the 28th Conference on Oct. 31–Nov. 2, 1994, pp. 492–496.*

\* cited by examiner

*Primary Examiner*—Marc D. Thompson
*Assistant Examiner*—Beatriz Prieto
(74) *Attorney, Agent, or Firm*—Douglas W. Cameron, Esq.; Kevin M. Jordan, Esq.; Heslin Rothenberg Farley & Mesiti P.C.

(57) ABSTRACT

Techniques for arranging operations performable on information in an information processing system are provided. In a system having a plurality of information producers and a plurality of information subscribers, paths are identified over which information traverses, and within which the information is subject to select and/or transform operations. The present invention optimizes the system by reorganizing the sequence of select and transform operations so that transforms follow select operations; and by combining multiple select and transform operations into single select and transform operations, respectively. Using these optimizations, the processing resources of the system can be reorganized, and/or information flow graphs describing the system can be designed, so that the select operations are "pushed" toward the producers, and transform operations are "pushed" toward the subscribers. Efficient content-based routing systems can then be used to implement the select operations.

16 Claims, 6 Drawing Sheets

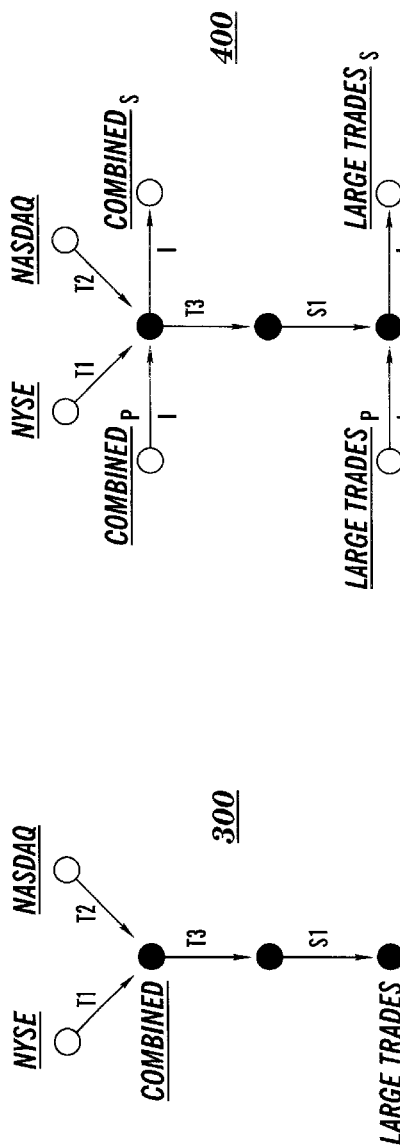
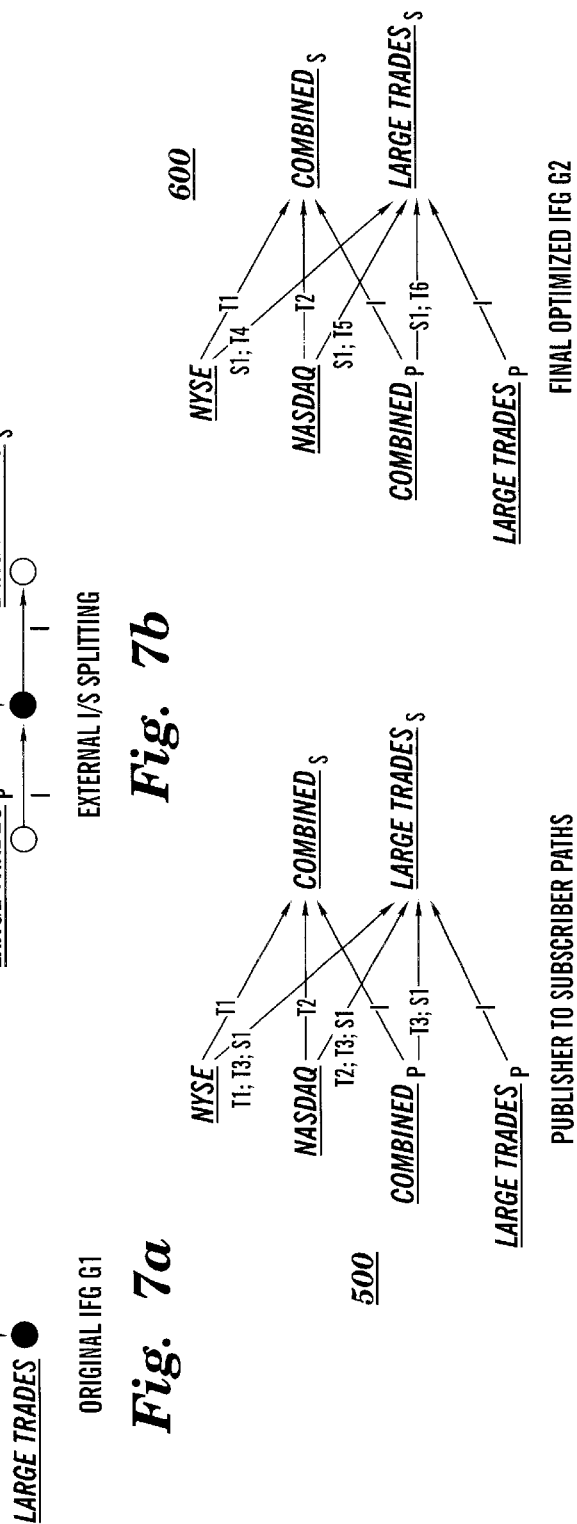

REDUCTION AND OPTIMIZATION OF INFORMATION PROCESSING SYSTEMS

CROSS-REFERENCE TO RELATED APPLICATIONS

This application relates to the commonly assigned, concurrently filed U.S. Pat. application Ser. No. 09/322,205 filed May 28, 1998, entitled "METHOD AND APPARATUS FOR SUMMARIZING MISSING EVENTS USING EVENT STREAM INTERPRETATION", which Application is incorporated by reference herein in its entirety.

TECHNICAL FILED

The present invention relates to information processing systems, and in particular relates to techniques for optimizing information processing paths within these systems.

BACKGROUND OF THE INVENTION

Messaging middleware, by supporting general messaging and message transformation between network nodes, facilitates the integration of distributed components of a processing application. Middleware collects messages from information producers ("publishers"), filters and transforms the messages as necessary, and disseminates applicable messages to interested information consumers ("subscribers"). This type of system is known as a publish/subscribe system. Publish/subscribe middleware systems are therefore important to the inter-connection of heterogeneous and distributed components of large information networks, which rely on message communication, in domains such as finance, process automation, and transportation.

A exemplary publish/subscribe system may be represented by an Information Flow Graph ("IFG") as a set of information publishing nodes which emit event messages, a set of information subscribing nodes which read event messages, a set of intermediate nodes where messages coming from streams along different input arcs are interleaved into an outgoing stream of messages, i.e., a replica of the stream is sent along each outgoing arc. The nodes may be connected by arcs of at least two kinds:

Selection arcs, which "filter" messages flowing from one node to another by only passing along messages which satisfy a predicate; and Transformation arcs, which "transform" messages flowing from one node to another by adding, dropping, and/or recomputing the fields of each message.

A publish/subscribe system may include a large network or "graph" of nodes and arcs, with many possible paths from each publishing node to each subscribing node, each path comprised of possibly many selection and transformation arcs, resulting in a particular sequence of operations between each publisher/subscriber node pair.

Using subject-based publish/subscribe systems as a starting point, recent advances include:

1. Content-based publish/subscribe. Rather than treating events as un-interpreted data with a single "subject" field, schemas are associated with event streams, and express subscriptions as predicates over all fields in the event.

2. Stateless event transformnations. To support scenarios where events from multiple publishers are similar but not identical, events may be subject to transform operations. These operations are stateless in the sense that they do not depend upon prior events.

3. Event stream interpretation. To support subscribers who are interested not only in published events but also in events such as summaries, trends, and alarms, derived from a sequence of related events, "stateful" operations are supported (operations whose results depend on the event history). State can also be used to express the "meaning" of an event stream, and by implication, the equivalence of two event streams.

Designers of such systems are often faced with the challenges of reducing abstract descriptions (e.g., Information Flow Graphs) of select and transform sequences between nodes into a system design which utilizes resources efficiently, and redesigning existing systems with the same goals. One particular problem involves the consolidation of transform operations at the periphery of the network, and select operations at the interior, so that existing techniques for efficient content-based subscription can be used as the basis for an optimized implementation of middleware.

SUMMARY OF INVENTION

The present invention provides techniques (methods, systems and computer program products) for reducing and optimizing publish/subscribe systems, wherein any operation sequence from one node to another may be replaced by an equivalent sequence comprised of a single select followed by a single transform operation. The optimization rules disclosed herein can be automatically applied during system design or redesign, similar to the way computer programs can be automatically optimized by state-of-art compilers.

Using a set of design rules disclosed herein, any system flow diagram (e.g., Information Flow Graph) may be converted or "rewritten" so that select operations are combined and "pushed" toward the sources (publishers), and transform operations are combined and "pushed" toward the subscribers. (Because transforms may destroy information, they cannot, in general be "pushed" ahead of selects.)

This rewriting can be done by an automated system having as its input a sequence of selects and transforms representing the flow and processing of messages. The system produces an optimized model which avoids transform functions for messages that would be eliminated by (later) select operations; and which "pushes" all selects in the information flow toward a single node so that all event distribution (selection) can be accomplished by a single content-based publish/subscribe system.

The present invention therefore advances the technology of messaging middleware and extends its range of application by providing optimizations which allow stateless messaging systems to be converted to a form which can exploit efficient multitask technology developed for content-based publish/subscribe systems.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

FIGS. 7a–c depict sequential stages of an optimization process on an exemplary Information Flow Graph, in accordance with the present invention;

FIG. 8 depicts a final, optimized Information Flow Graph resulting from the operations of FIGS. 7a–c, in accordance with the present invention.

DETAILED DESCRIPTION OF THE PREFERRED EMBODIMENT(S)

Figure 1:
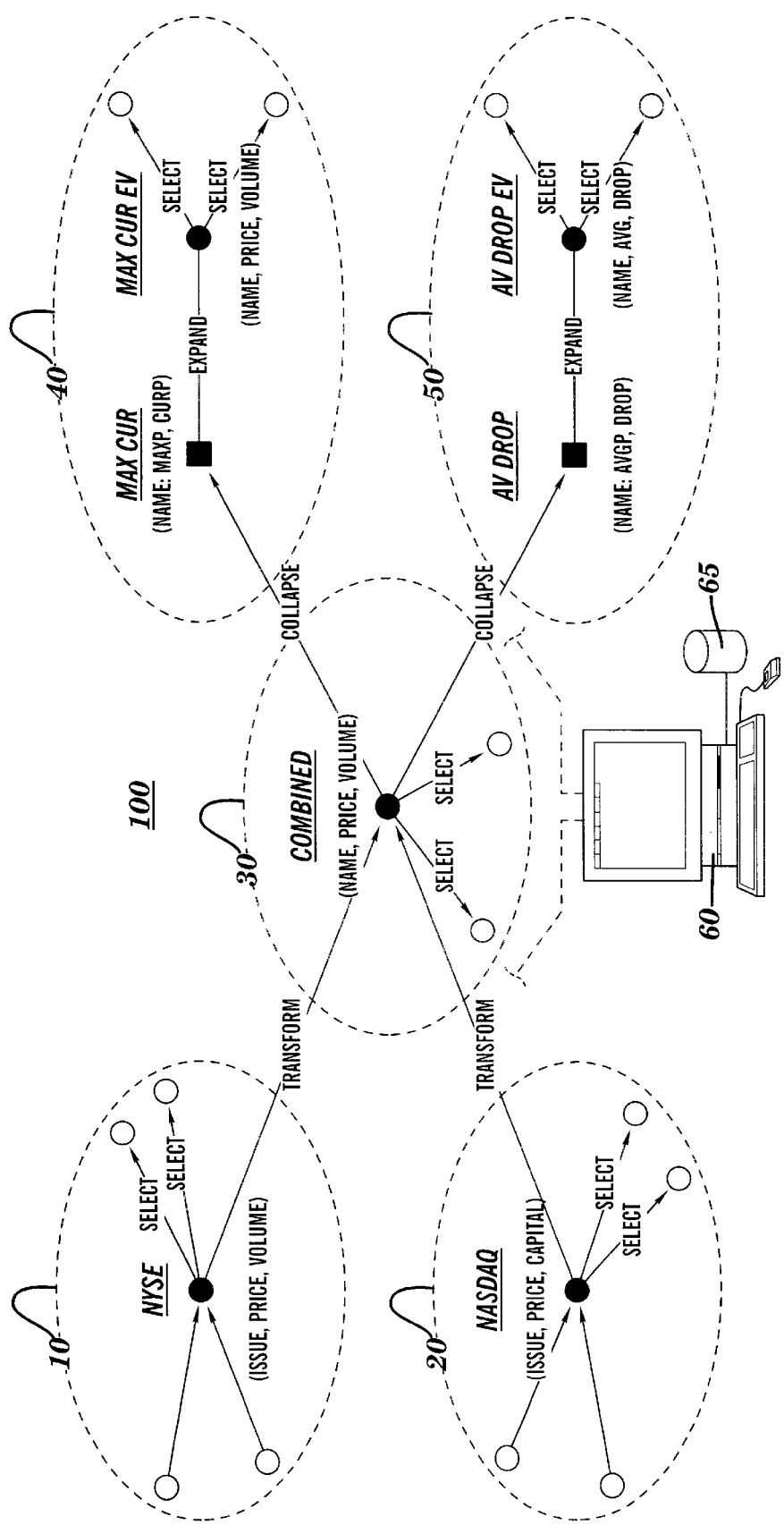
FIG. 1 is an Information Flow Graph describing an exemplary message processing system having a plurality of information producers and a plurality of information subscribers, with intermediate select and transform operations.

By way of background, FIG. 1 is an information Flow Graph ("IFG") for a message processing system 100 for handling stock market information. An IFG may adhere to the following exemplary syntax:

Information spaces ("I/S"). They are either event histories (filled circles, e.g. NYSE) or states (filled squares, e.g. MaxCur). Event histories are lists of events. They may grow monotonically over time as events are added. States capture selected information about event streams, and are typically not monotonic. The type of an information space is defined by an information schema. Each event. may be a typed tuple. For instance, the NASDAQ information space is a sequence of events having the schema [issue: string, price: integer, capital: integer]. The MaxCur information space is a state represented as a keyed relation associating the name of a stock issue with its maximum price and current price. Certain event histories, represented as unfilled circles, are sources or sinks; these represent the information providers and consumers. (The terms "information space" and "node" are used broadly herein and connote any identifiable combination of hardware and/or software to or from which messages are passed. The terms "message," "event" and "record" are similarly used broadly herein and connote data passed between nodes without restriction to format or transmission type.)

Dataflows. These are directed arcs (arrows) with associated operations connecting nodes in the graph. The graph may be required to be acyclic, sources must have only out-arcs, sinks have only in-arcs, and state nodes have only a single in-arc. The arcs determine how the contents of the information spaces change as events enter the system.

There are four types of dataflows with associated operations, indicated by the labels on the arcs:

Select. This arc/operation connects two event histories having the same schema. Associated with each select arc is a predicate on the attributes of the event type associated with the information space. An example of a predicate is the expression (issue="XYZ" & price<120). All events in the information space at the source of the arc which satisfy the predicate are delivered to the information space at the destination of the arc.

Transform. This arc/operation connects any two event histories which may have different event schemas $E_S$ and $E_D$. Associated with each transform arc is a rule for mapping an event of type $E_s$ into an event of type $E_D$. For example, the transform arc connecting the space NASDAQ to the space Combined is labeled with the rule [issue:i, price:p, capital:c]→[name: NAS(i), price:p, volume:c/p]. This rule maps the issue to a name using the function NAS, and derives volume as capital divided by price. Whenever a new event arrives at the space at the source of the arc, it is transformed using the rule and delivered to the space at the destination of the arc.

Collapse. This arc/operation connects an event history to a state. Associated with each collapse arc is a rule for collapsing a sequence of events to a state. The rule maps a new event and a current state into a new state. For example the following rules define the collapse arc from the space Combined to the space Maxcur:

<n,p,v>, <n: max<p, cur>∪s→<n:p, p>∪s <n,p,v>, <n: max≧p, cur>∪s→<n:max, p>∪s

Given an initial state (in this example, a maximum and current price of zero for all stocks), the state at the destination of the arc is updated each time a new event is added to the space at the source of the arc by applying the rule.

Expand. This is the inverse of Collapse. This arc links a state to an information space. Associated with each arc is a collapse rule. When the state at the source of the arc changes, the destination space is updated so that the sequence of events it contains collapses to the new state. Unlike the other dataflows, expand is non-deterministic. For a given state, there may be many possible event sequences which map to the state, or there may be none. The non-determinism is further constrained by the need for information spaces to be observably monotonic: that is, an expansion may not "undeliver" an event already delivered to a consumer. We restrict the syntax to avoid the case in which ere is no possible event sequence, but we exploit the non-determinism to give flexibility to the implementation to deliver one of a set of equivalent event sequences.

In addition to the above four operations, there are two operations implicit in the graph. Fan-in (merge) to an event history produces a merge of the events. (There is non-determinism here, as multiple interleavings are possible.) Fan-out (split) from an event history replicates the events.

Consider regions 10 and 20 of the IFG 100 of FIG. 1. Each of the regions has an information space, a collection of producers, and a collection of consumers with content-based selections of the events of the information spaces NYSE and NASDAQ. These regions are examples of "pure content-based pub/sub" systems. The consumers with content-based selections correspond to subscribers.

Region 30 represents a service attempting to integrate the two spaces NYSE and NASDAQ. These exchanges have different conventions for issue names; therefore it is desirable to map the local issue names to a common name via some conversion table. Further, one exchange delivers trades using price and volume, the other using price and total capital (price times volume). It is therefore necessary to map these into either one of the two formats or a common format. The result is a new information space Combined, containing the union of the two original information spaces, but in a common format, enabled by the use of stateless event transforms. Subscribers to the new service can deal with this new space and need not even be aware of the existence of the original suppliers.

Region 40 represents a collection of subscribers to Combined who are interested in particular stock events, but whose requirements on guaranteed delivery are weaker. An event history, such as Combined has a total order. Even though the total order depends upon non-deterministic factors, such as the order in which events from NYSE and events from NASDAQ are merged, the dataflow semantics discussed in the previous section guarantee that all subscribers to Combined receive the events in the same order. Guaranteeing this total order adds to the cost of the delivery protocol.

However, the subscribers to region 40 have a weaker requirement: they are interested only in tracking the maximum price and current price of each stock issue. They cannot ignore ordering entirely (otherwise they might swap today's price of XYZ with yesterday's price), but they can ignore the order between today's XYZ price and today's AB price. And under appropriate conditions, messages may be dropped altogether. These subscribers express this requirement by defining an event interpretation—a mapping of the event sequence into a state which captures precisely the information relevant to these consumers, namely the current and maximum price of each issue.

The collapse operation converts the event sequence from Combined into a state representing this event interpretation. The expand operation converts the state back into an event sequence. The associated rule on this arc is the identical rule from the collapse arc. Therefore, the events in MaxCurEv can be any sequence of events whose interpretation is the same as the interpretation of the events in Combined. A trivial solution is to treat the collapse and expand as a null operation and deliver exactly the same events to Combined and to MaxCurEv. However, the non-determinism of expand permits cheaper solutions, in which some events can be dropped or permuted. One instance where this flexibility is important occurs when the subscriber disconnects from the network without terminating the subscription and later reconnects. Rather than bombarding the subscriber with all the events which would have been delivered during the disconnect period, the system instead delivers a much shorter equivalent system that preserves the specified interpretation: the current and maximum price of each stock. A technique for computing and delivering a minimal event sequence is disclosed in the above-designated, concurrently filed U.S. Patent Application.

Once the collapse operation has been introduced, it is possible to use it not only for equivalent event sequences, but also for deriving new types of events from the state. In region 50, a collapse operation is introduced to compute a state AvgDrop which tracks for each stock issue, the average price and the magnitude of the largest recent price drop. From that state, an expand operation can be introduced to produce a new event space named AvgDropEv. Consumers wishing to be alerted to "alarms" such as a drop exceeding 20 can then subscribe to this derived event space.

The IFGs discussed herein are logical descriptions of the flow of events in a message processing system (possibly stored on computer media). Ultimately, this description must be realized on a physical network of messaging nodes. The problem of mapping an arbitrary logical IFG to a physical broker network is non-trivial. If done naively, the performance of efficient content-based routing systems cannot be exploited at all.

In accordance with the present invention, an approach to realization of efficient IFGs representing a messaging system involves reducing an input IFG to one that can be efficiently implemented on a content-based routing system. The technique involves designing/redesigning the IFG so that all the select operations are grouped together and moved closer to publishers, and all transform-operations are grouped together and moved closer to the subscribers. (Because transforms may destroy information, they cannot, in general be pushed ahead of selects.) This allows the use of content-based routing protocols to implement the select operations within the network, and implementation of the transform operations at the periphery of the network. Further, it is possible to optimize away transform operations on events that would be eliminated by later select operations.

Designing/redesigning the IFG can be done by an automated system so that, while users specify information flows as a series of selects and transforms that closely matches the way they think about the flow and processing of events (or the way that a current, inefficient system is described), the inventive system can optimize the processing of information flows. Such an automated system 60 is shown in FIG. 1, and can be used with any type of computer media 65 upon which the input and output IFGs, and/or computer program products facilitating the present invention, can be stored.

The rules for IFG design/redesign are described below, in accordance with the present invention.

Notation:

An event (message or record) is a set of attribute_name:value pairs, e.g.,

{SER:12345 NAME:"marc"TEXT:"whatever xxxx"}

NULL value rule: Each event message defines every possible attribute by the following rule—if an event does not explicitly contain a value for a particular attribute_name, then that attribute is (implicitly) considered to have the special value NULL. For example, the previous example message "implicitly" contains the attribute_name:value pair NONSENSE:NULL.

An event message stream is a sequence of event messages flowing along an arc one I/S to another I/S.

A "select" operation operates on a stream, passing messages through that satisfy a (possibly complex) predicate and suppressing (dropping) all other messages. Using "SELECT" syntax from SQL (SQL is a standard database language):

Stream_IN→(SELECT * FROM Stream_IN WHERE Predicate( ))→Stream_OUT (simplified information flow syntax: Stream_IN→[Predicate( )]→Stream_OUT)

Predicate( ) is an arbitrary boolean valued function of any attribute names and constants. (Predicate functions must deal with NULL values appropriately.)

A "transform" operation operates on a stream, for each input message it produces an output message whose attribute values are arbitrary functions of the input attribute values and constants. Using "SELECT" syntax from SQL:

Stream_IN→(SELECT f1( ) as a1, f2( ) as a2, . . . , fk( ) as ak FROM Stream_INS) →Stream_OUT (simplified information flow syntax: Stream_IN→[a1:=f1( ) a2:=f2( ) . . . ak:=fk( )] →Stream_Out)

where each of f1( ), f2( ), . . . , fk( ) are arbitrarily valued functions of any attribute names and constants. (Each function must deal with NULL values appropriately, possibly yielding NULL as its value.) Each of a1, a2 . . . ak is an (output) attribute name. For each input message "transform" processing simply computes and outputs the "transformed message" {a1:f1( ) a2:f2( ) . . . ak:fk( )}

EXAMPLE:

input message: {LO_TEMP_F:41 HI_TEMP_F:59 DATE:"1998.53"} transform: [AVG_TEMP_C:=(((LO_TEMP_F +HI_TEMP_F)/2–32)*(5/9)) DATE:=DATE]

output message: {AVG_TEMP_C:10 DATE:"1998.53"}

Selects can be Pushed Ahead of Transforms:

For any dataflow in which a transform TransformA is followed by select SelectB, there is an equivalent dataflow of the form SelectB followed by TransformB. Observing that the predicate of SelectA must be a function of constants and the function outputs of TransformA, a predicate for SelectB is constructed that will choose the same messages as SelectA, by substituting the appropriate functions of TransformA for the attributes in the predicate of SelectA.

Figure 2:
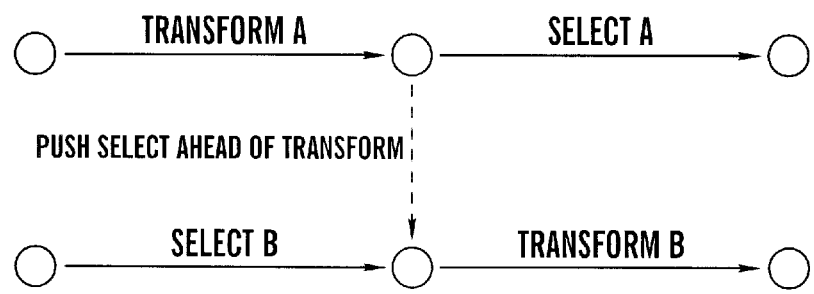
FIG. 2 depicts the conversion of a transform:select sequence into a select:transform sequence, in accordance with the present invention.

For example, for a dataflow in the form:

Stream_IN→TranformA→SelectA→Stream_OUT there is an equivalent dataflow of the form:

Stream_IN→SelectB→TransformB→Stream_OUT shown diagrammatically in FIG. 2.

By observing that the predicate of SelectA must be a function of constants and the (sub)function outputs of TransformA, a predicate for SelectB can be constructed that will "choose" the same messages as SelectA, by substituting the appropriate (sub)functions of TransformA for the "variables" (attributes) in the predicate of SelectA, e.g.:

[y1:=f1(x1,x2,c1) y2:=f2(x1,x2,c2)]→[p(y1,y2,d)]

can be re-written as:

[p(f1(x1,x2,c1),f2(x1,x2,c2),d)]→[y1:=f1(x1,x2,c1) y2:=f2(x1,x2,c2)]

where x1,x2,y1,y2 are (different) attribute names and c1,c2,d are constants.

For simplicity, it is assumed that each transform operation uses a new "non-conflicting" set of attribute names in its output messages.

Figure 3:
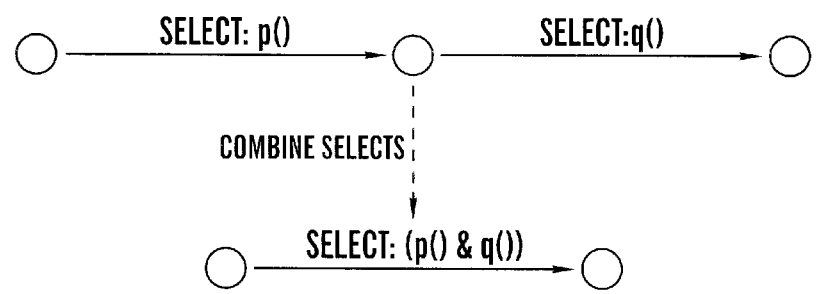
FIG. 3 depicts the conversion of two sequential select operations into a single select operation, in accordance with the present invention.

Selects and Transforms can be Combined:

A sequence of selects is a conjunction of predicates. Thus, selects SelectA: (p( . . . )) followed by SB: (q( . . . )) can be rewritten as SC: (p( . . . ) & q( . . . )), since a sequence of SELECTs is a conjunction of predicates, e.g.:

[p( )]→[q( )]

can be rewritten as:

[p( )&q( )]

shown diagrammatically in FIG. 3.

Figure 4:
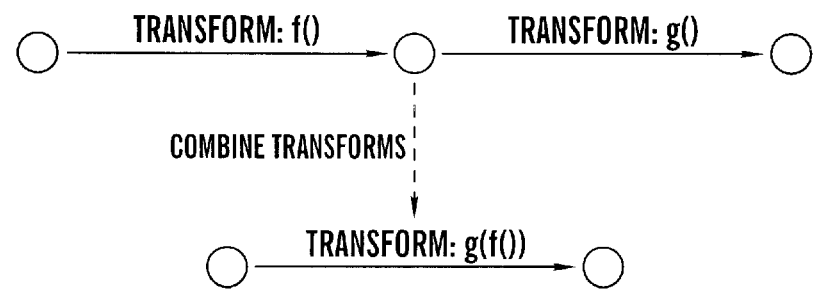
FIG. 4 depicts the conversion of two sequential transform operations into a single transform operation, in accordance with the present invention.

Similarly, variable substitions can be performed from a first transform into a second, shown diagrammatically in FIG. 4. For example:

[x, y]→[y1:=f1(x1,x2,c1), y2:=f2(x1,x2,c2)];

[y1, y2]→[z1:=g1(y1,y2,d1), z2:=g2(y1,y2,d2)]

can be rewritten as:

[x,y]→[z1:=g1 (f1 (x1,x2,c1),f2(x1 ,x2,c2),d1), z2:=g2(f1(x1,x2,c1),f2(x1,x2,c2),d2)]

By applying these rewriting rules, any sequence of selects and transforms can be reduced to a single select followed by a single transform. For example, starting with the sequence [T T S T S T], we push selects ahead of transforms to get [S S T T T T], and combine selects and transforms to get [S T].

Once a dataflow has been reduced to a single (Select→Transform) pair the single Select can be "optimized". A straight-forward application of the re-writing rules may cause many "common subexpressions" to appear within the "master" predicate. An efficient implementation can discover those, just like any good compiler, and avoid re-computation of (sub)functions. Likewise the final, single transformation will likely contain many common "subexpressions" and many of those will have already been computed for the select. An efficient implementation can "remember(cache) those results" and/or "tag" each selected message with them as auxiliary attribute_name:values.

Merges—multiple publishers to a stream:

Two (or more) event streams can be merged by "interleaving" their sequences of messages into one sequence. The order of interleaving can be arbitrary, but in practice will usually be in order of arrival.

Suppose two message stream sources A and B require the following processing:

"filter" source A with (SelectA;TransformA);

"filter" source B with (SelectB;TransfonmB);

"merge" the filtered sources; and apply final filter (SelectC;TranformC) to the merged, filtered sources.

Any single message originating from A and "surviving" to Stream_OUT, will be subjected to:

(SelectA;TransformA;SelectC;TransformC)

and any single message originating from B and "surviving" to Stream_OUT will be subjected to:

(SelectB;TransformB;SelectC;TransformC).

Figure 5:
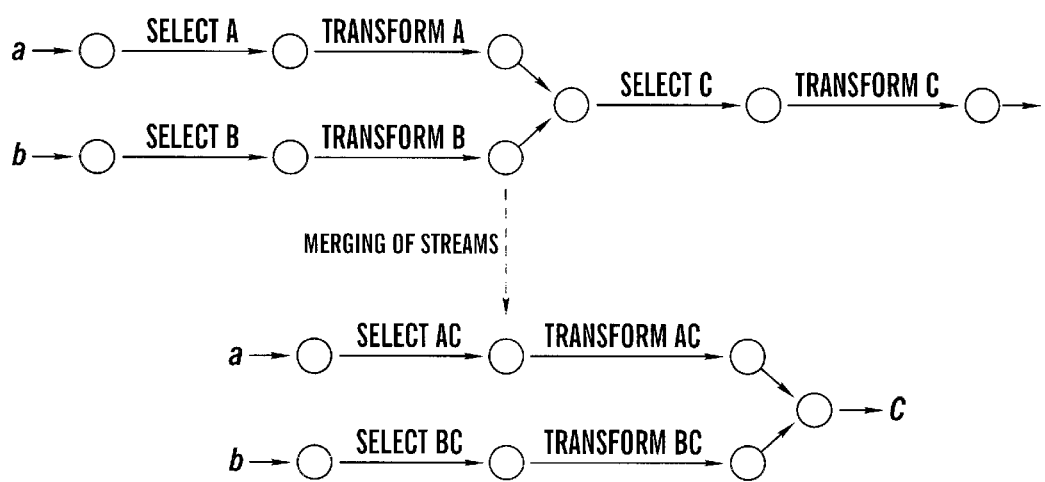
FIG. 5 depicts a message stream merge operation in accordance with the present invention.

If the (Select;Tranform) equivalent of:

(SelectA;TransformA;SelectC;TransfortnC)

is computed and called:

(SelectAC;TranformAC)

and likewise:

(SelectB;TransformB;SelectC;TransformC)

is computed and called:

(SelectBC;TranformBC)

the above merged processing is equivalent to:

"filter" source A with (SelectAC;TransformAC);

"filter" source B with (SelectBC;TransformBC);

and "merge" the filtered sources, shown diagrammatically in FIG. 5.

Therefore any "subscription" to any "network" of Selects, Transforms, Merges is equivalent to the merge of a set of subscriptions, each of which is a "simple" (Select;Transform) on an (unfiltered) input message stream.

Splits—multiple Subscriptions:

An information flow system must support multiple "subscribers" and "subscription" definitions. But each subscription definition can be reduced to a single (Select;Transform) pair on a message stream (or the merge of several "simple" subscriptions). Using the re-ordering/re-writing rules above, it does not matter how or if one subscription is defined (in terms of another or in terms of "intermediate" or "administered" "subscription points") its subscription reduces to a single (Select;Tranform) pair.

Externalizing I/S Nodes as Terminal Nodes:

As the select and transform operations specified by an IFG are combined and/or rearranged, the non-terminal (interior) nodes may be eliminated or changed. However, users who specify IFGs may wish to use a non-terminal or internal node as a publication and/or subscription point (e.g., the node labeled Combined in FIG. 1). To avoid losing such nodes due to rewriting an IFG: For each internal node that may be used as a publication point, an explicit terminal node with an identity arc that connects to the internal node is added; and for each internal node that may be used as a subscription point, an explicit terminal node with an identity arc from the internal node to the terminal node is added.

Thus, all publication and subscription points are represented by the terminal nodes of the IFG. All arcs and internal nodes can now be safely subjected to rewriting rules and optimizations.

Figure 6:
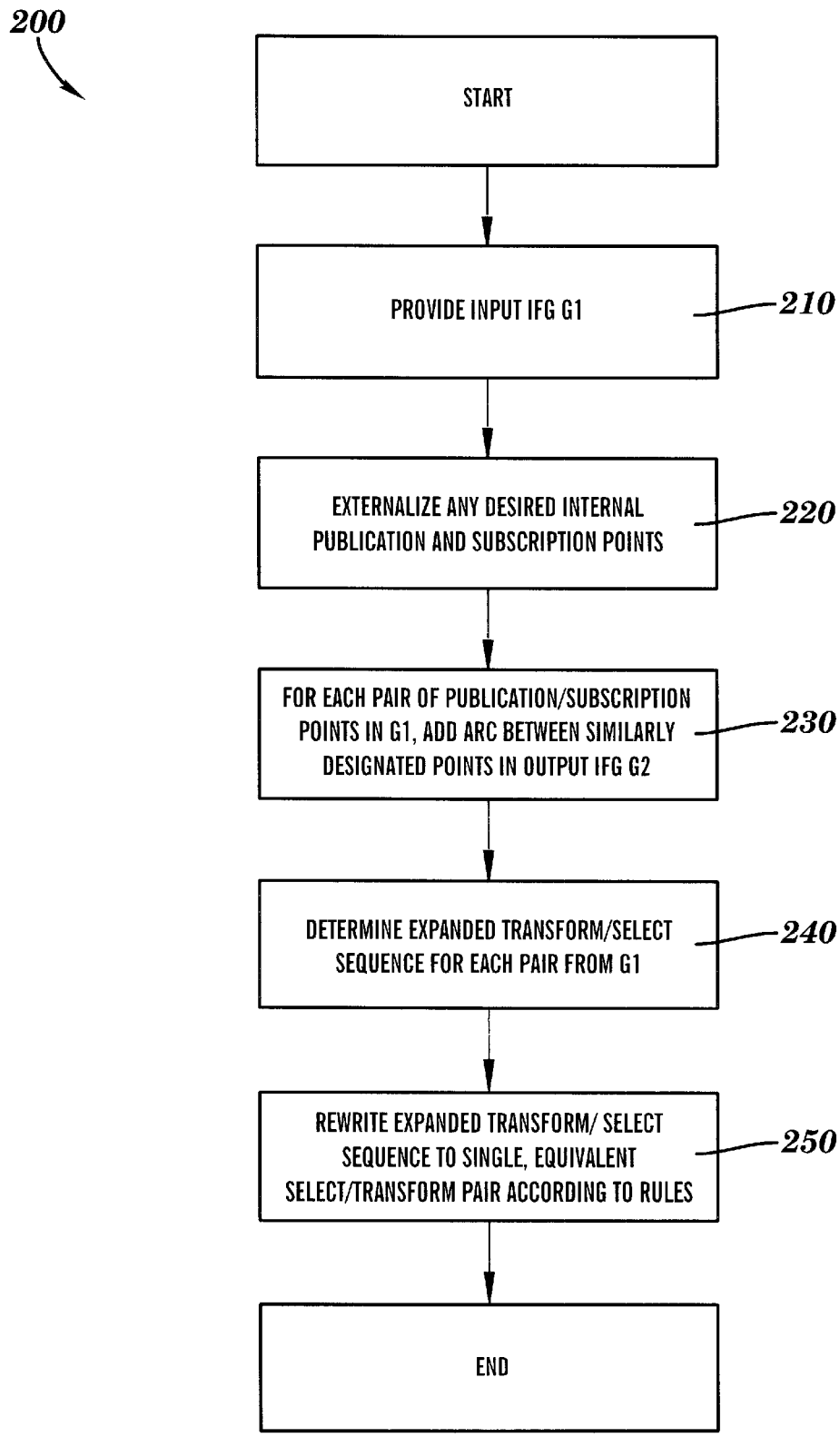
FIG. 6 is a flow diagram illustrating the steps necessary to arrange operations within an exemplary Information Flow Graph describing a message processing system, in accordance with the present invention.

Example Design/Redesign of an IFG:

An exemplary design/redesign of an IFG is presented with reference to the flow diagram of FIG. 6 and the IFGs of FIGS. 7–8.

With reference to FIG. 6, consider an input IFG G1 (STEP 210), with all interesting publication and subscription points (optionally) externalized (STEP 220). An equivalent, output IFG G2 can be constructed as follows. For each publication and subscription point in G1, add a like-named publication or subscription point to the output IFG G2 (STEP 230). For each possible pair (p,s) of publication and subscription points in G1, if there is a path from p to s in G1 consisting of arcs labeled with a transform and/or select sequence of operations:

$$p \rightarrow (ts1; ts2; \ldots ; tsk) \rightarrow s$$

add a single arc (STEP 240) from p to s in G2 that is labeled with the (select;transform) pair of operations that is equivalent to the (ts1; ts2; . . . ; tsk) sequence, as given by the above rules (STEP 250).

As an example, consider the IFG 300 for stock services shown in FIG. 7a, which is similar to that of FIG. 1, integrating two independent stock markets NYSE and NASDAQ into the combined information space Combined. In this example, the messages from both sources must first undergo a lookup conversion (T1 and T2). A capital field is then added to each message which is the product of the number of shares in the trade and the price per share (T3). The new value-added information space Large Trades is derived from Combined by using a select operation (S1), which selects those trades involving over a million dollars.

As shown in FIG. 7b, each externally visible I/S is (optionally) externalized, i.e., split into two in IFG 400: one for publishers and another for subscribers, e.g., Combined is split into Combined$_p$ and Combined$_s$. This step is necessary to ensure that, after transform, all of the advertised content is still available to dynamically joining publishers and subscribers.

Next, all paths in the graph of IFG 400 are identified to arrive at IFG 500 of FIG. 7c. For each path that has more than one select or transform, the design rules above are applied so that 1) selects are moved before transforms, and 2) a sequence of selects or a sequence of transforms is combined into a single instance of each. In this example, three such paths are handled:

1. NYSE to LargeTrades$_s$: T1; T3; S, which reduces to: S1: (price*vol>=1000000); T4: [issue, price, vol]→ [com=NYS(issue), cap=price*vol].
2. NASDAQ to LargeTrades$_s$: T2; T3; S, which reduces to: S1: (price*vol>=1000000); T5: [issue, price, vol] →[com=NAS(issue), cap=price*vol].
3. Combined$_p$ to LargeTrades$_s$: T3; S, which reduces to: S1: (price*vol>=1000000); T6: [com, price, vol]→ [com, cap=price*vol].

Each path from a publisher to a subscriber is now of the form of a single select followed by a single transform, as shown in the final, optimized IFG 600 of FIG. 8.

The selects can now be implemented by an efficient content-based routing system using one large look-up table, and the transforms performed before delivery to subscribers.

Redesign/rewriting of any IFG for Implementation by a Single Content-based Publish Subscribe System:

The individually derived paths back can be combined into a single "master" I/S, which may be implemented as a content-based publish/subscribe system. These paths can then be split by adding an additional select based on message source, and internally tagging the transforms with a source. Before an event is delivered to a subscriber, it is transformed based on the I/S to which the client subscribed and the source of the message. Tagged transforms can be stored in a table for lookup and execution before the system delivers a message to a client. New subscriptions coming into any of the subscription points (Combined or LargeTrades) have their content filters modified based on the filter arcs out of the root into these spaces by applying the above rules.

Figure 9A:
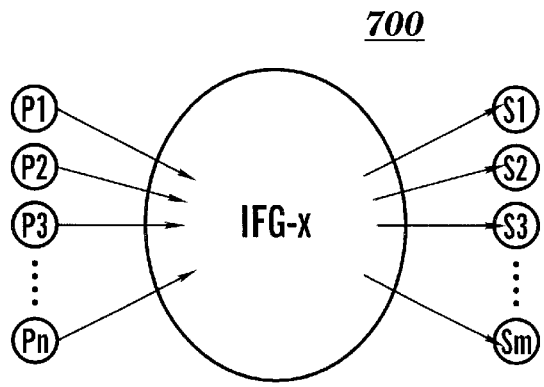
FIGS. 9a–c depict the conversion of an arbitrary IFG to one which can be implemented with a single content-based publish/subscribe system.

Consider an information flow graph IFG-x 700 with n "externalized" publication points P1, P2, P3, . . . Pn and m "externalized", terminal subscription points S1, S2, S3, . . . Sm, as shown in FIG. 9a. The ellipse IFG-x is assumed to contain an arbitrary IFG whose details are not shown, but which may be similar to the IFGs depicted in FIGS. 1 and 7 herein.

Figure 9B:
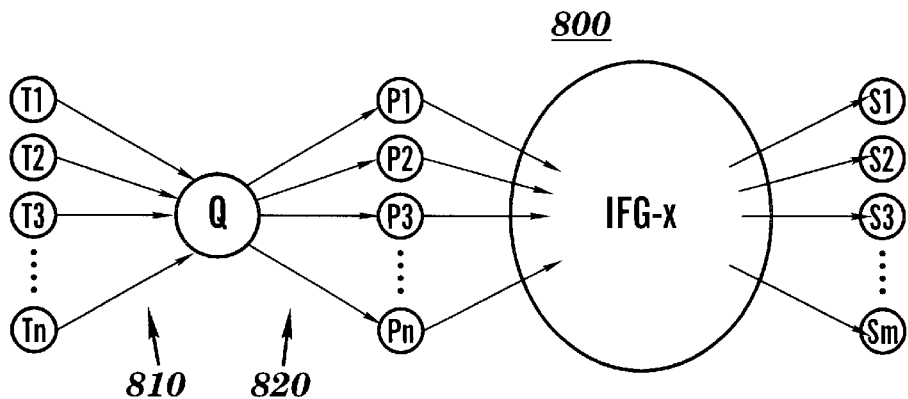

An equivalent IFG 800 with external publication points T1, T2, T3, . . . Tn and a single internal node/information space Q through which all event messages must "pass" can be formed as shown in FIG. 9b. The following process is then implemented:

For each i, i=1,2,3, . . . , n:

Messages that were published to publication point Pi should be published to the corresponding new, equivalent external publication point Ti.

Messages flowing along the arcs 810 from Ti to Q are transformed so that they carry a new attribute called $Source whose value is set to "$Pi". This effectively "tags" each message with the name and number of its "source" publication point.

Messages flowing along the arcs 820 from Q to Pi are selected by the predicate $Source=?="$Pi". This effectively "filters" messages so only messages "intended" for (internal) publication point Pi flow to Pi.

("$Source" is assumed to be a "reserved" attribute name, not used in any schema within IFG-x.)

Figure 9C:
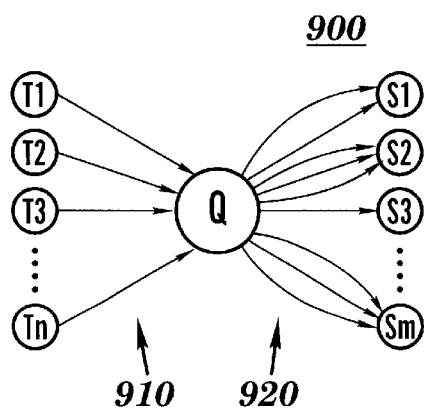

The basic re-writing rules of the previous sections can now be automatically and repeatedly applied to create IFG 900 of FIG. 9c, and replace, for each j, every arc 920 from Q to Sj with a single (optimized) select, Select'(j,k), and a single (optimized) transform, Transform'(j,k), so that the IFG represented in FIG. 9b can be reduced to a simple and regular IFG of the "star" form shown in FIG. 9c, where there are n external publication points T1, T2, T3, . . . Tn; m external subscription points S1, S2, S3, . . . Sm; and just a single "internal" information space Q.

For each i=1,2, . . . ,n the arcs 810/910 from each Ti to Q "tag" each message with its "source". For each j=1,2, . . . ,m the arcs 920 from Q to each Sj first select the messages required by the subscriber j and then transform each message as required by the subscriber j. Because there may have been several paths from Q to Sj "through" IFG-x in the unoptimized IFG (as shown in FIG. 9b), there may be several corresponding arcs from Q to Sj, each with a different optimized pair of Select'(j,k); Transform'(j,k) functions (k=1,2, . . . for each arc from Q to Sj.) in FIG. 9c.

As a result, all the select operations implied by the arcs "emanating" from Q can be advantageously performed by a single content-based publish/subscribe system of the kind described in U.S. Patent Applications: Ser. No. 08/975,303, filed Nov. 20, 1997 and entitled "Routing Messages Within a Network Using the Data content of the Message;" and Ser. No. 08/975,280, filed Nov. 20, 1997 and entitled "Method and System for Matching Consumers to Events;" which are hereby incorporated by reference herein in their entirety.

While the invention has been particularly shown and described with reference to preferred embodiment(s) thereof, it will be understood by those skilled in the art that various changes in form and details may be made therein without departing from the spirit and scope of the invention.

What is claimed is:

1. A method for arranging operations performable on message streams in a message processing system by a first operation sequence between two nodes in the system, the first operation sequence having a transform operation followed by a select operation, the method comprising:

converting the first operation sequence into a second, equivalent operation sequence comprising a select operation followed by a transform operation.

2. The method of claim 1, wherein the first operation sequence comprises a plurality of transform operation and a plurality of select operations and wherein the second, equivalent operation sequence comprises a plurality of select operations followed by a plurality of transform operations.

3. The method of claim 2, wherein said converting comprises:

combining the plurality of select operations into a single, equivalent select operation; and combining the plurality of transform operations into a single, equivalent transform operation, whereby the second, equivalent operation sequence comprises the single, equivalent select operation followed by the single, equivalent transform operation.

4. A method for reorganizing message processing operations in a message processing system comprising using the arranging method of claim 1.

5. The method of claim 4, wherein said reorganizing is facilitated by an automated processing system.

6. A method for arranging an information flow graph descriptive of message processing operation for a method processing system, comprising using the arranging method of claim 1 on said information flow graph.

7. The method of claim 6, wherein said method for arranging the information flow graph is performed on an automated processing system, and wherein the information flow graph comprises information tangibly stored on media in said automated processing system.

8. The method of claim 1, wherein said converting comprises:

reducing a number of calculations required to determine the second, equivalent operation sequence by storing results of any common subexpressions thereof and using said stored results instead of recalculating the common subexpressions.

9. A system for arranging operation performable on message streams in a message processing system, comprising:

a first node and a second node, wherein a first operation sequence between the first node and second node comprises a transform operation followed by a select operation, wherein the select operation comprises determining whether input data satisfies one or more criteria; and mean for converting the first operation sequence into a second, equivalent operation sequence comprising a select operation followed by a transform operation.

10. The system of claim 9, wherein the first operation sequence comprises a plurality of transform operations and a plurality of select operations and wherein the second, equivalent operation sequence comprises a plurality of select operation followed by a plurality of transform operations.

11. The system of claim 10, wherein said means for converting comprises:

means for combining the plurality of select operation into a single, equivalent select operation; and means for combining the plurality of transform operations into a single, equivalent transform operation, whereby the second, equivalent operation sequence comprises the single, equivalent select operation followed by the single, equivalent transform operation.

12. The system of claim 9, wherein said means for converting comprises:

means for reducing a number of calculations required to determine the second, equivalent operation sequence by storing results of any common subexpressions thereof and using said stored results instead of recalculating the common subexpressions.

13. At least one program storage device readable by a machine, tangibly embodying at least one program of instructions executable by the machine to perform a method for arranging operations performable on message streams in a message processing system by a first operation sequence between two nodes in the system, the first operation sequence having a transform operation followed by a select operation, the method comprising:

converting the first operation sequence into a second, equivalent operation sequence comprising a select operation followed by a transform operation.

14. The at least one program storage device of claim 13, wherein the first operation sequence comprises a plurality of transform operations and a plurality of select operations and wherein the second, equivalent operation sequence comprises a plurality of select operations followed by a plurality of transform operations.

15. The at least one program storage device of claim 14, wherein said converting comprises:

combining the plurality of select operation into a single, equivalent select operation; and combining the plurality of transform operations into a single, equivalent transform operation, whereby the second, equivalent operation sequence comprises the single, equivalent select operation followed by the single, equivalent transform operation.

16. The at least one program storage device of claim 13, wherein said converting comprises:

reducing a number of calculations required to determine the second, equivalent operation sequence by storing results of any common subexpressions thereof and using said stored results instead of recalculating the common subexpressions.

* * * * *

UNITED STATES PATENT AND TRADEMARK OFFICE
CERTIFICATE OF CORRECTION

PATENT NO. : 6,681,220 B1
DATED : January 20, 2004
INVENTOR(S) : Kaplan et al.

It is certified that error appears in the above-identified patent and that said Letters Patent is hereby corrected as shown below:

Title page,
Item [54], Title, delete "REDUCTION AND OPTIMIZATION OF INFORMATION PROCESSING SYSTEMS" and insert -- REDUCTION AND OPTIMIZATION OF OPERATIONAL EXPRESSIONS APPLIED TO INFORMATION SPACES BETWEEN NODES IN A PUBLISH/SUBSCRIBE SYSTEM --

Column 11,
Line 46, delete the word "operation" and insert -- operations --

Column 12,
Line 43, delete the word "operation" and insert -- operations --

Signed and Sealed this

Eleventh Day of May, 2004

JON W. DUDAS
*Acting Director of the United States Patent and Trademark Office*